United States Patent [19]
Baumann

[11] Patent Number: 6,010,379
[45] Date of Patent: Jan. 4, 2000

[54] EXHAUST GAS SYSTEM FOR OCEAN-GOING VESSELS, PREFERABLY FOR MILITARY PURPOSES

[75] Inventor: Knut Baumann, Hamburg, Germany

[73] Assignee: Blohm + Voss GmbH, Hamburg, Germany

[21] Appl. No.: 09/093,149

[22] Filed: Jun. 8, 1998

[30] Foreign Application Priority Data

Jun. 6, 1997 [DE] Germany ............... 197 23 997

[51] Int. Cl.[7] ............ B63H 21/32; B63B 15/00; F01N 3/02; F23J 15/00

[52] U.S. Cl. .............. 440/89; 114/187; 60/317; 110/203

[58] Field of Search ............... 440/1, 88, 89, 440/3; 60/310, 317; 114/187; 110/203

[56] References Cited

U.S. PATENT DOCUMENTS 4,303,035  12/1981  Burns ......................... 114/187
4,586,908   5/1986  Schlichthorst .
4,993,314   2/1991  Braden et al. ................. 98/58

*Primary Examiner*—D. Glenn Dayoan
*Assistant Examiner*—Patrick Muldoon
*Attorney, Agent, or Firm*—Nils H. Ljungman and Associates

[57] ABSTRACT

In an exhaust gas system for ocean-going vessels, preferably for military purposes, that are equipped with at least one internal combustion engine and at least one gas turbine, the exhaust gases from the gas turbine and the exhaust gases from the internal combustion engine are introduced into a collector exhaust gas duct which extends essentially horizontally through the hull of the ship to the stern of the vessel, where it empties into the atmosphere a short distance above the water line. The exhaust gases are mixed in the collector exhaust duct, whereby the hot exhaust gases from the gas turbine are cooled by the comparatively cooler exhaust gases from the internal combustion engine, thereby reducing the risk of infrared detection.

20 Claims, 7 Drawing Sheets

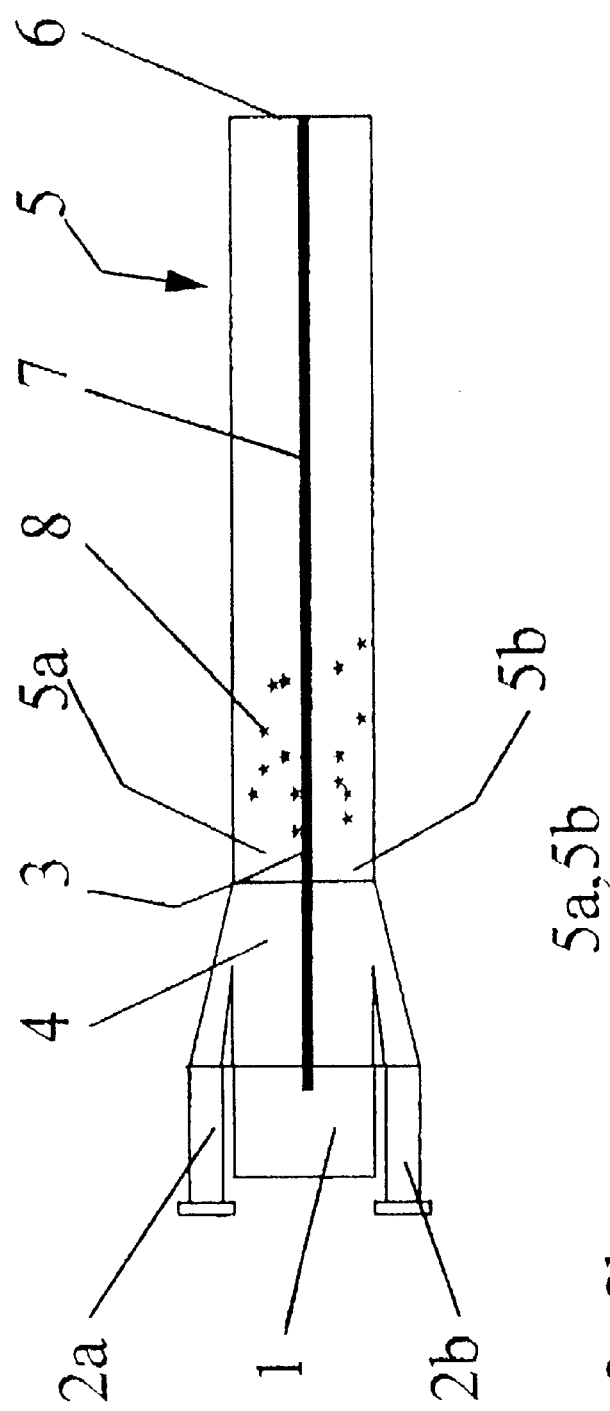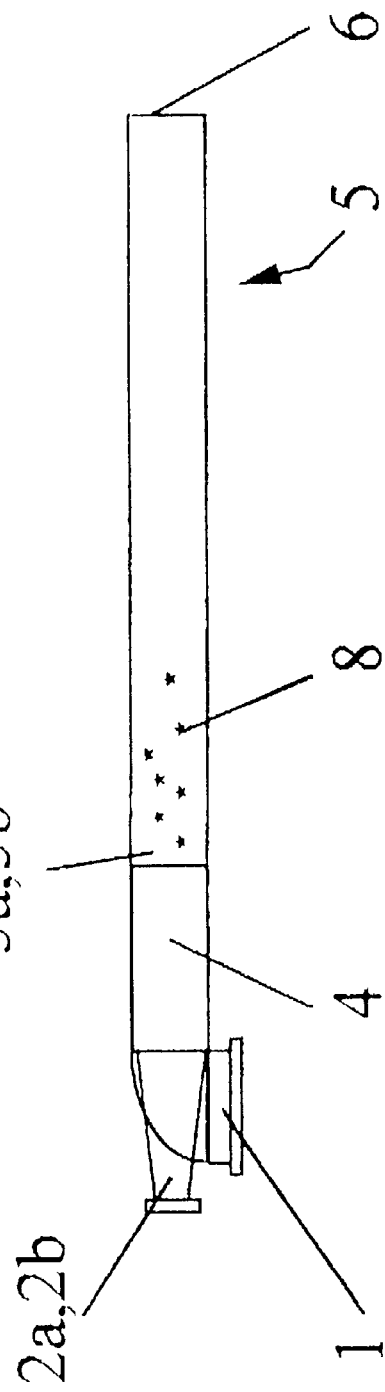

EXHAUST GAS SYSTEM FOR OCEAN-GOING VESSELS, PREFERABLY FOR MILITARY PURPOSES

BACKGROUND OF THE INVENTION

1. Field of the Invention:

This invention relates to an exhaust gas system for ocean-going vessels, preferably for military purposes, that are equipped with at least one internal combustion engine, preferably with Diesel propulsion, and at least one gas turbine, in which the exhaust gases from the internal combustion engine(s) and the exhaust gases from the gas turbine (s) are transported through the hull of the ship and released into the atmosphere at a discharge point which is located above the waterline.

2. Background Information:

On similar known exhaust gas systems, each of the exhaust gas lines is routed individually to an outlet, whereby these outlets are either in the stack or on the sides of the ship's hull. In addition to significant requirements in terms of material, weight and space, these systems operate at a relatively high discharge temperature of the exhaust gas stream from the gas turbine, because even if the exhaust from the gas turbine has been cooled by the injection of sea water, for example, its temperature is still so high that on ocean-going vessels for military purposes, the ship can be detected by infrared sensors.

OBJECT OF THE INVENTION

One object of the present invention is to eliminate the disadvantages described above.

Another object of the present invention includes eliminating, or reducing, the disadvantages associated with the current significant requirements in terms of material, weight and space, as well as the relatively high discharge temperature of the exhaust gas stream.

SUMMARY OF THE INVENTION

The present invention teaches that this object can be accomplished by routing essentially all of the exhaust gas lines so that they empty into at least one collector exhaust duct, in which a mixing of the exhaust gas streams takes place, and by locating the outlet on the stern of the ship, to which the collector exhaust duct is guided essentially horizontally. This arrangement results in the elimination of a plurality of individual exhaust gas ducts, and not only reduces the space, effort, time and expense required for construction, but also cools the hot exhaust gases from the gas turbine by mixing them with the exhaust gases from the internal combustion engines, which have generally already cooled, and thereby reducing the risk of detection by infrared sensors. A further reduction of this risk is achieved by moving the exhaust gas outlet to the stern of the ship, because at that point, the output can be placed relatively close to the water line, compared to the location of the outlet on the sides of the ship.

One possible embodiment of the present invention comprises an arrangement which promotes the mixing of the exhaust gas streams for the popular combination of one gas turbine and two Diesel engines. In accordance with at least one embodiment of the present invention, on ocean-going vessels with two internal combustion engines and one gas turbine, the point where the exhaust gas line from the gas turbine empties into the collector exhaust gas duct lies between the mouths of the exhaust gas lines from the internal combustion engines, whereby the collector exhaust gas duct is divided centrally by a partition which extends from the vicinity where the exhaust gas lines empty into it to the outlet.

In at least one embodiment of the present invention, as an additional measure to reduce the risk of infrared detection, when the outlet of the collector exhaust gas duct is located a short distance above the water line, the collector exhaust gas duct can be equipped in the vicinity of the outlet with a reversal, turn-around or baffle directed toward the surface of the water.

The exhaust gas system in accordance with at least one embodiment of the present invention can be used with a known method of cooling exhaust gases by the injection of sea water into the exhaust gas stream.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention will be described in reference to the accompanying figures, wherein:

FIGS. 1 and 2 are schematic illustrations of an exemplary embodiment of an exhaust gas system in accordance with the present invention on a ship that has one gas turbine and two Diesel engines, wherein FIG. 1 is an an overhead view of the system, and FIG. 2 is a side view of the system;

FIGS. 6–8 refer to a ship propulsion system comprising structure and/or components which may be used in conjunction with at least one embodiment of the present invention, and the structure and functioning of which may aid in the understanding of the instant invention, wherein:

FIG. 6 shows an embodiment of a propulsion system with two separate transmissions for the Diesel engines;

FIG. 7 shows an embodiment of a propulsion system in which the two transmissions for the Diesel engine propulsion can be coupled to one another by means of a connecting transmission; and FIG. 8 shows a ship which could possibly utilize the present invention.

DESCRIPTION OF THE PREFERRED EMBODIMENTS

Figure 3:
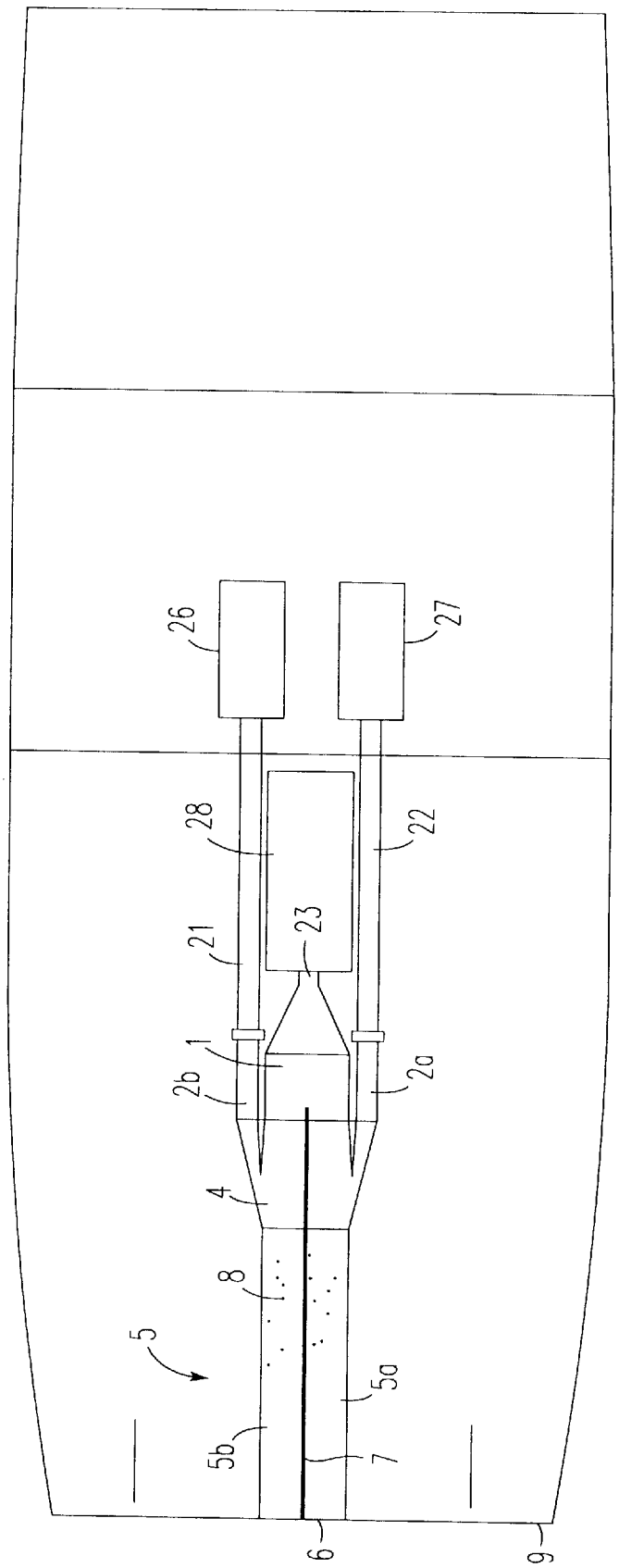
FIG. 3 shows a schematic illustration of a propulsion system utilizing one possible embodiment of the present invention.

In one possible embodiment of the present invention, as shown schematically in FIGS. 1 and 2, reference number 1 designates a tube segment that is connected on one end via a flange to the exhaust gas line (not shown) from the gas turbine, and on the other end to a mixing chamber 4. Reference numbers 2a and 2b are two tube segments that can be connected on one end, each by means of a flange, to the exhaust gas lines (also not shown) from the Diesel engines, and on the other end to the mixing chamber 4, whereby the upper tube segment 1 empties into the mixing chamber 4 centrally between the latter two tube segments 2a and 2b. Connected to the mixing chamber 4 is an essentially straight collector exhaust gas duct 5 which, on its free end, has an outlet 6 that empties into the atmosphere, and which is located on the stern of the ship (not shown), close to the water line (also not shown). The collector exhaust gas duct 5 is divided centrally by an upright partition 7, so that in each of the halves 5a, 5b of the duct, essentially 50% of the gas turbine exhaust gases are mixed with 100% of the pre-cooled exhaust gases from a Diesel engine, and are transported to the outlet 6.

As a result of this mixing of the comparatively hot exhaust gases from the gas turbine with the cooler exhaust gases from the internal combustion engines, the exhaust gases from the gas turbine are cooled, which has a favorable effect on the risk of detection by infrared sensors. A further cooling of the exhaust gases can be achieved by injecting sea water 8 into the collector exhaust gas duct halves 5a and 5b.

As a result of the lateral injection of the pre-cooled Diesel exhaust gases into the exhaust gas stream from the gas turbine, a layer of cooler air accumulates on the inside of the common exhaust duct, which further reduces thermal radiation.

Figure 4:
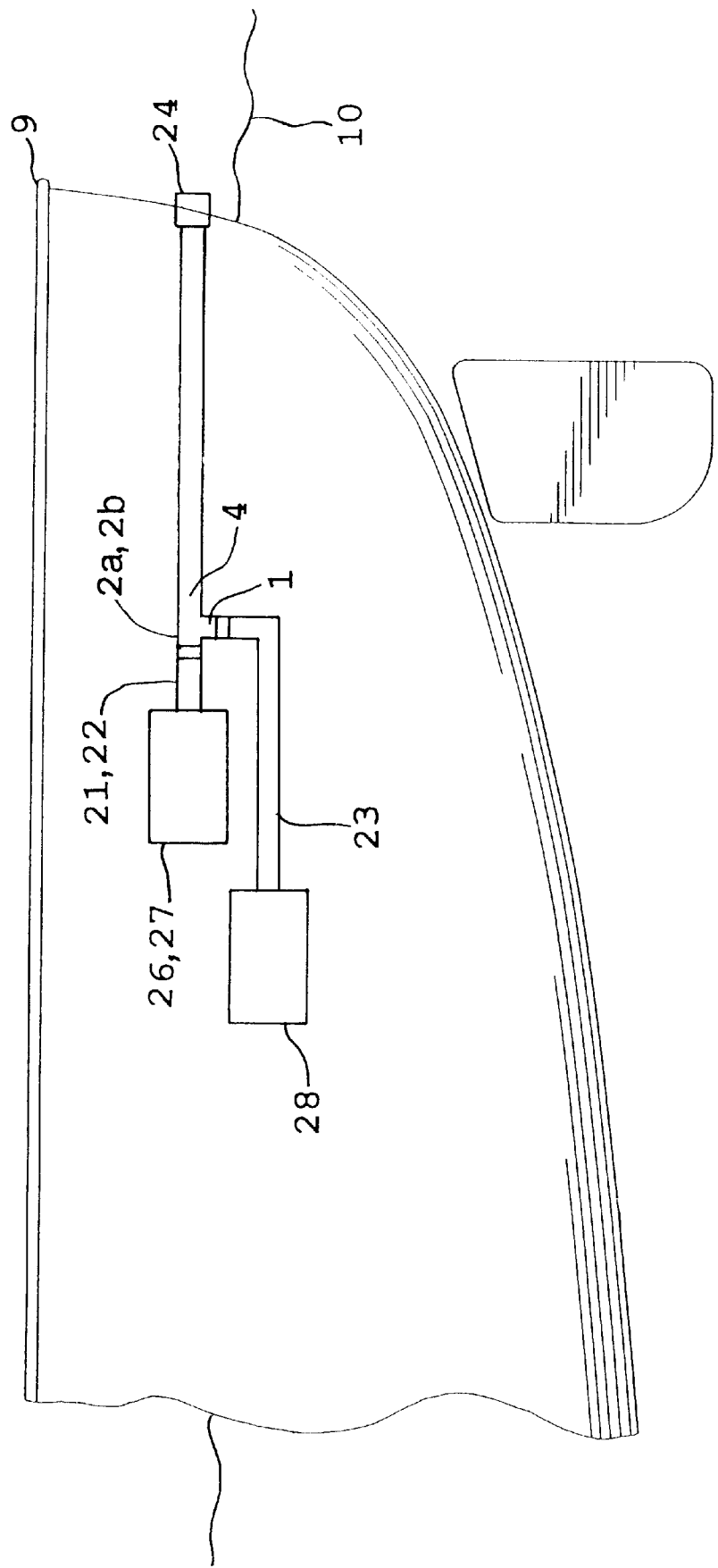
FIG. 4 shows a schematic illustration of another propulsion system utilizing one possible embodiment of the present invention.
Figure 5:
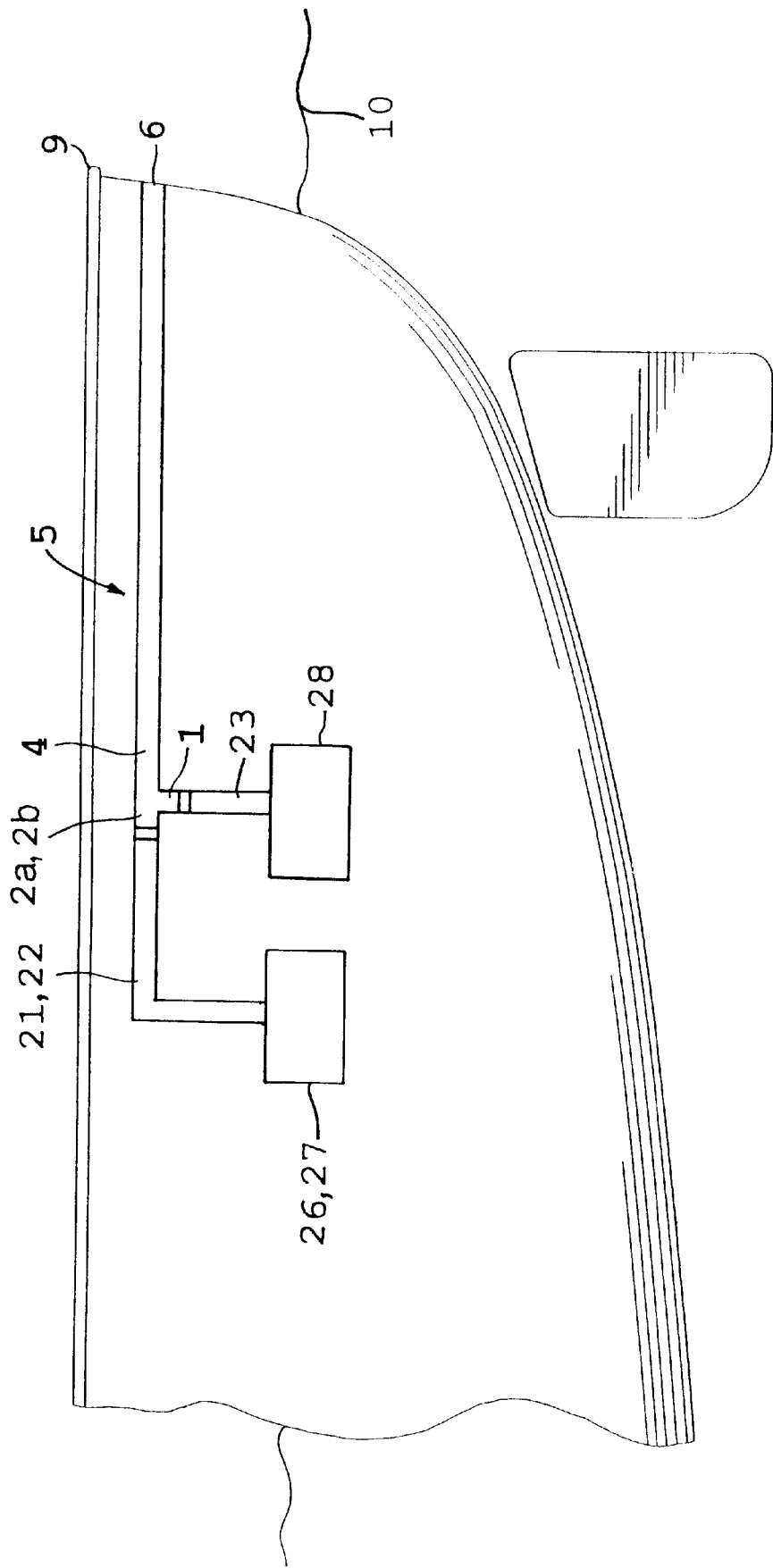
FIG. 5 shows another schematic illustration of another possible propulsion system utilizing one possible embodiment of the present invention.

FIGS. 3–5 illustrate schematically a variety of possible propulsion systems and/or arrangements that could potentially utilize possible alternative embodiments of the present invention. FIGS. 3–5 show schematically a gas turbine engine 28, with an exhaust gas line 23 connected to the tube segment 1; and diesel engines 26, 27 with exhaust gas lines 21, 22, connected to tube segments 2a, 2b. The outlet 6, can be located on the stern 9, and the collector exhaust gas duct 5 can be equipped in the vicinity of the outlet 6 with a reversal or baffle 24 directed toward the surface of the water 10 (FIG. 4). In at least one embodiment of the present invention, this directing of the exhaust gases toward the cooler water can potentially even further cool the exhaust gases and thereby even further reduce any thermal radiation. Other possible propulsion systems with varying numbers of diesel and/or turbine engines can also potentially be used in conjunction with other possible embodiments of the present invention.

One feature of the invention resides broadly in the exhaust system for ocean-going ships, preferably for military purposes, that are equipped with at least one internal combustion engine, preferably with Diesel propulsion, and at least one gas turbine, in which the exhaust gases from the internal combustion engine(s) and the exhaust gases from the gas turbine(s) are transported through the hull of the ship and released into the atmosphere at a discharge point which is located above the waterline, characterized by the fact that all the exhaust gas lines are routed so that they empty into at least one collector exhaust duct 5, in which a mixing of the exhaust gas streams takes place, and that the outlet 6 is preferably located on the stern of the ship, to which the collector exhaust duct 5 is guided essentially horizontally.

Another feature of the invention resides broadly in the exhaust gas system characterized by the fact that on ocean-going vessels with two internal combustion engines and one gas turbine, the point where the exhaust gas line from the gas turbine empties into the collector exhaust gas duct 5 lies between the mouths of the exhaust gas lines from the internal combustion engines, whereby the collector exhaust gas duct 5 is divided centrally by a partition 7 which extends from the vicinity where the exhaust gas lines empty into it at 4 to the outlet 6.

Yet another feature of the invention resides broadly in the exhaust gas system characterized by the fact that when the outlet 6 of the collector exhaust gas duct 5 is located a short distance above the water line, the collector exhaust gas duct 5 is equipped in the vicinity of the outlet 6 with a reversal, turn-around or baffle 24 directed toward the surface of the water.

Still another feature of the invention resides broadly in the exhaust gas system characterized by the use of the method (itself part of the known art) of cooling exhaust gases by the injection of sea water 8 into the exhaust gas stream.

Examples of ships and vessels and/or components thereof, which could possibly be used in conjunction with the present invention may be found in U.S. Pat. No. : 5,137,116 issued on August 1992 to Von Bergen et al.; U.S. Pat. No. 2,512,361 issued on June, 1950 to Mercier; U.S. Pat. No. 2,584,252 issued on February, 1952 to Bourgeois; U.S. Pat. No. 3,632,120 issued on January, 1972 to Brandt; U.S. Pat. No. 3,689,082 issued on September, 1972 to Satterthwaite; U.S. Pat. No. 3,847,453 issued on November, 1994 to Herbert; U.S. Pat. No. 3,985,365 issued on October, 1976 to Catanzaro; U.S. Pat. No. 4,041,718 issued on August, 1977 to Stone; U.S. Pat. No. 4,436,313 issued on March, 1984 to Tamama et al.; U.S. Pat. No. 4,448,425 issued on May, 1984 to Von Bergen; U.S. Pat. No. 5,209,497 issued on May, 1993 to Von Bergen et al.; U.S. Pat. No. 2,153,674 issued on April, 1939 to Ommundson; U.S. Pat. No. 2,719,737 issued on October, 1995 to Fletcher; U.S. Pat. No. 2,943,874 issued on July, 1960 to Valdi et al.; U.S. Pat. No. 3,088,744 issued on May, 1963 to Ezekiel et al.; U.S. Pat. No. 3,529,839 issued on September, 1970 to Greiner et al.; U.S. Pat. No. 3,572, 727 issued on March, 1971 to Greiner; U.S. Pat. No. 3,726,531 issued on April, 1973 to Pagan et al.; U.S. Pat. No. 3,770,179 issued on November, 1973 to McHugh; U.S. Pat. No. 4,094,512 issued on June, 1978 to Back; U.S. Pat. No. 4,296,935 issued on October, 1981 to Inouye; U.S. Pat. No. 4,534,569 issued on August, 1995 to Ishitani et al.; U.S. Pat. No. 4,538,820 issued on September, 1985 to Duffee; U.S. Pat. No. 4,586,719 issued on May, 1986 to Marsi et al.; 4,632,403 issued on December, 1986 to Ishitani et al.; U.S. Pat. No. 4,973,065 issued on November, 1990 to Habich; U.S. Pat. No. 4,984,811 issued on January, 1991 to Kuwabara et al.; U.S. Pat. No. 5,219,434 issued on June, 1993 to Von Bergen et al.; U.S. Pat. No. 3,625,523 issued on December, 1971 to Gardner et al.; U.S. Pat. No. 3,664,675 issued on May, 1972 to Malmstrom; U.S. Pat. No. 3,838,862 issued on October, 1974 to Fern; U.S. Pat. No. 3,854,732 issued on December, 1974 to Franz et al.; U.S. Pat. No. 4,174,672 issued on November, 1979 to Cox; U.S. Pat. No. 4,428,587 issued on January, 1984 to Forch; U.S. Pat. No. 4,482,159 issued on November, 1984 to Ishitani et al.; U.S. Pat. No. 4,698,156 issued on October, 1987 to Bumpers; U.S. Pat. No. 4,724,078 issued on February, 1988 to Auriol et al.; U.S. Pat. No. 4,780,213 issued on October, 1988 to Ogletree; U.S. Pat. No. 4,844,255 issued on July, 1989 to Schmitt; U.S. Pat. No. 5,064,534 issued on November, 1991 to Busch et al.; U.S. Pat. No. 5,267,736 issued on December, 1993 to Pietsch et al.; U.S. Pat. No. 2,300,385 issued on October, 1942 to Kollberg et al.; U.S. Pat. No. 2,752,175 issued on June, 1956 to Fletcher; U.S. Pat. No. 4,078,832 issued on March, 1978 to Wittman; U.S. Pat. No. 5,411,273 issued on May, 1995 to Pietsch et al.; U.S. Pat. No. 3,210,086 issued on October, 1965 to Hudson et al.; U.S. Pat. No. 3,413,008 issued on November, 1968 to Greiner; U.S. Pat. No. 4,195,854 issued on April, 1980 to Bertin; U.S. Pat. No. 4,344,631 issued on August, 1982 to Winn; U.S. Pat. No. 4,395,141 issued on July, 1983 to Peitsch et al.; U.S. Pat. No. 5,356,320 issued on October, 1984 to Von Bergen et al.; U.S. Pat. No. 5,492,492 issued on February, 1996 to Von Bergen et al.; U.S. Pat. No. 5,374,208 issued on December, 1994 to Von Bergen et al.; U.S. Pat. No. 4,413,829 issued on November, 1983 to Pietsch; U.S. Pat. No. 4,793,773 issued on December, 1988 to Kinouchi et al.; U.S. Pat. No. 5,419,724 issued on May, 1995 to Wyland et al.; U.S. Pat. No. 4,786,264 issued on November, 1988 to Asanabe et al.; U.S. Pat. No. 5,616,056 issued on April, 1997 to Meissner; U.S. Pat. No. 4,309,914 issued on January, 1982 to Hiersig et al.; U.S. Pat. No. 4,417,878 issued on November, 1983 to Koren; U.S. Pat. No. 5,643,026 issued on July, 1997 to Pietsch et al.; U.S. Pat. No. 3,934,952 issued on January, 1976 to Gardner; U.S. Pat. No. 5,632,661 issued on May, 1997 to Jurgens et al.; U.S. Pat. No. 1,618,549 issued on February, 1927 to O'Toole; U.S. Pat. No. 3,134,443 issued on May, 1964 to Snow; U.S. Pat. No. 3,716,014 issued on February, 1973 to Laucks et al.; U.S. Pat. No. 4,419,085 issued on December, 1983 to Laucks et al.; U.S. Pat. No. 4,465,431 issued on August, 1984 to Gross; and 5,082,423 issued on January, 1992 to Morgan.

Examples of baffles and/or exhaust baffles and/or components thereof, which could possibly be used in conjunction with the present invention may be found in U.S. Pat. No.: 5,421,753 issued on Jun. 6, 1995 to P. Roos; U.S. Pat. No. 5,441,568 issued on Aug. 15, 1995 to T. Cho, et al.; U.S. Pat. No. 5,444,196 issued on Aug. 22, 1995 to W. Woods; U.S. Pat. No. 5,451,728 issued on Sep. 19, 1995 to N. Chandler, et al.; and U.S. Pat. No. 5,388,408 issued on Feb. 14, 1995 to P. Lawrence.

Examples of exhaust systems and/or components thereof, which could possibly be used in conjunction with the present invention may be found in U.S. Pat. No. : 4,579,073 issued on Apr. 1, 1986 to Sadler et al.; U.S. Pat. No. 1,033,403 issued on July, 1912 to Hough; U.S. Pat. No. 1,591,554 issued on July, 1926 to Guion; U.S. Pat. No. 2,086,989 issued on July, 1937 to Raad; U.S. Pat. No. 2,494,469 issued on January, 1950 to Booth; U.S. Pat. No. 2,747,324 issued on May, 1956 to Zalkind; U.S. Pat. No. 2,774,150 issued on December, 1956 to Genin; U.S. Pat. No. 3,566,742 issued on March, 1971 to Bemiss; U.S. Pat. No. 4,031,838 issued on June, 1977 to Schmidt et al.; U.S. Pat. No. 4,476,798 issued on October, 1984 to Backus; U.S. Pat. No. 4,586,908 issued on May 6, 1986 to Schlichthorst; U.S. Pat. No. 712,881 issued on November, 1902 to Wilson; U.S. Pat. No. 1,816,371 issued on July, 1931 to Hefti; U.S. Pat. No. 2,575,698 issued on November, 1951 to Wilson; U.S. Pat. No. 3,185,123 issued on May, 1965 to Schiffer; U.S. Pat. No. 5,732,644 issued on Mar. 31, 1998 to Sell; and U.S. Pat. No. 2,601,663 issued on June, 1952 to Lamp.

Examples of other systems and/or components thereof, which could possibly be used in conjunction with the present invention may be found in U.S. Pat. No. : 5,464,321 issued on Nov. 7, 1995 to Williams et al.; U.S. Pat. No. 5,466,177 issued on Nov. 14, 1995 to Aihara et al.; U.S. Pat. No. 5,397,255 issued on Mar. 14, 1995 to Heer; U.S. Pat. No. 5,403,216 issued on Apr. 4, 1995 to Salmi et al.; U.S. Pat. No. 5,395,272 issued on Mar. 7, 1995 to Smith; U.S. Pat. No. 5,401,198 issued on Mar. 28, 1995 to Toyohara et al.; U.S. Pat. No. 5,390,622 issued on Feb. 21, 1995 to Kishi et al.; U.S. Pat. No. 5,378,179 issued on Jan. 3, 1995 to Riggle; U.S. Pat. No. 5,389,022 issued on Feb. 14, 1995 to Kobayashi; U.S. Pat. No. 5,421,753 issued on Jun. 6, 1995 to Roos; U.S. Pat. No. 5,404,711 issued on Apr. 11, 1995 to Rajput; U.S. Pat. No. 5,383,126 issued on Jan. 17, 1995 to Ogawa et al.; U.S. Pat. No. 5,378,180 issued on Jan. 3, 1995 to Nakayama et al.; U.S. Pat. No. 5,428,957 issued on Jul. 4, 1995 to Keates; U.S. Pat. No. 5,420,591 issued on May 30, 1995 to Annee et al.; U.S. Pat. No. 5,432,515 issued on Jul. 11, 1995 to O'Conner; U.S. Pat. No. 5,474,454 issued on Dec. 12, 1995 to Knapp et al.; U.S. Pat. No. 5,452,640 issued on Sep. 26, 1995 to Bovee et al.; U.S. Pat. No. 5,465,973 issued on Nov. 14, 1995 to Anderson; U.S. Pat. No. 5,469,721 issued on Nov. 28, 1995 to Pyle; U.S. Pat. No. 5,474,480 issued on Dec. 12, 1995 to Schwarz et al.; U.S. Pat. No. 5,413,461 issued on May 9, 1995 to Johnsen; U.S. Pat. No. 5,389,790 issued on Feb. 14, 1995 to Honey et al.; U.S. Pat. No. 5,397,236 issued on Mar. 14, 1995 to Fegg et al.; U.S. Pat. No. 5,424,741 issued on Jun. 13, 1995 to Genovese; U.S. Pat. No. 5,475,381 issued on Dec. 12, 1995 to Williamson et al.; and U.S. Pat. No. 5,435,761 issued on Jul. 25, 1995.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

Figure 6:
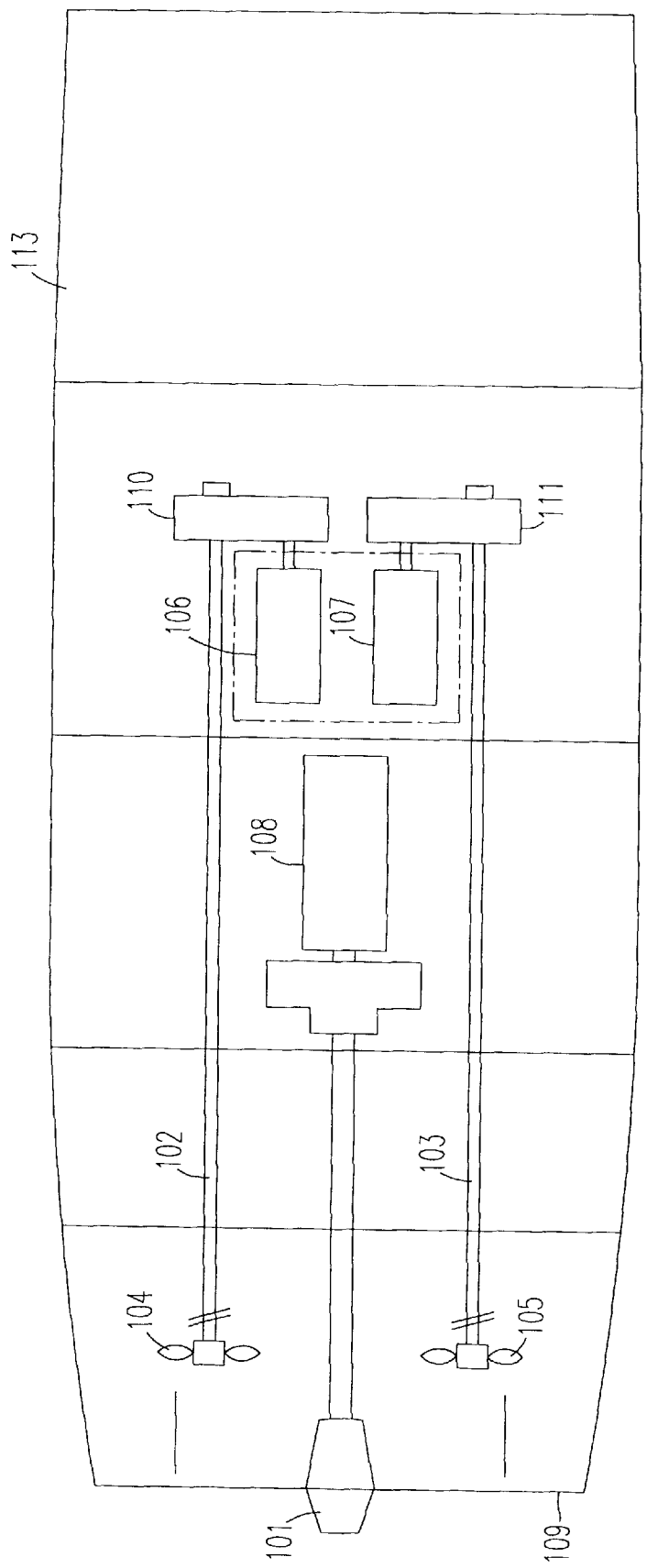
Figure 7:
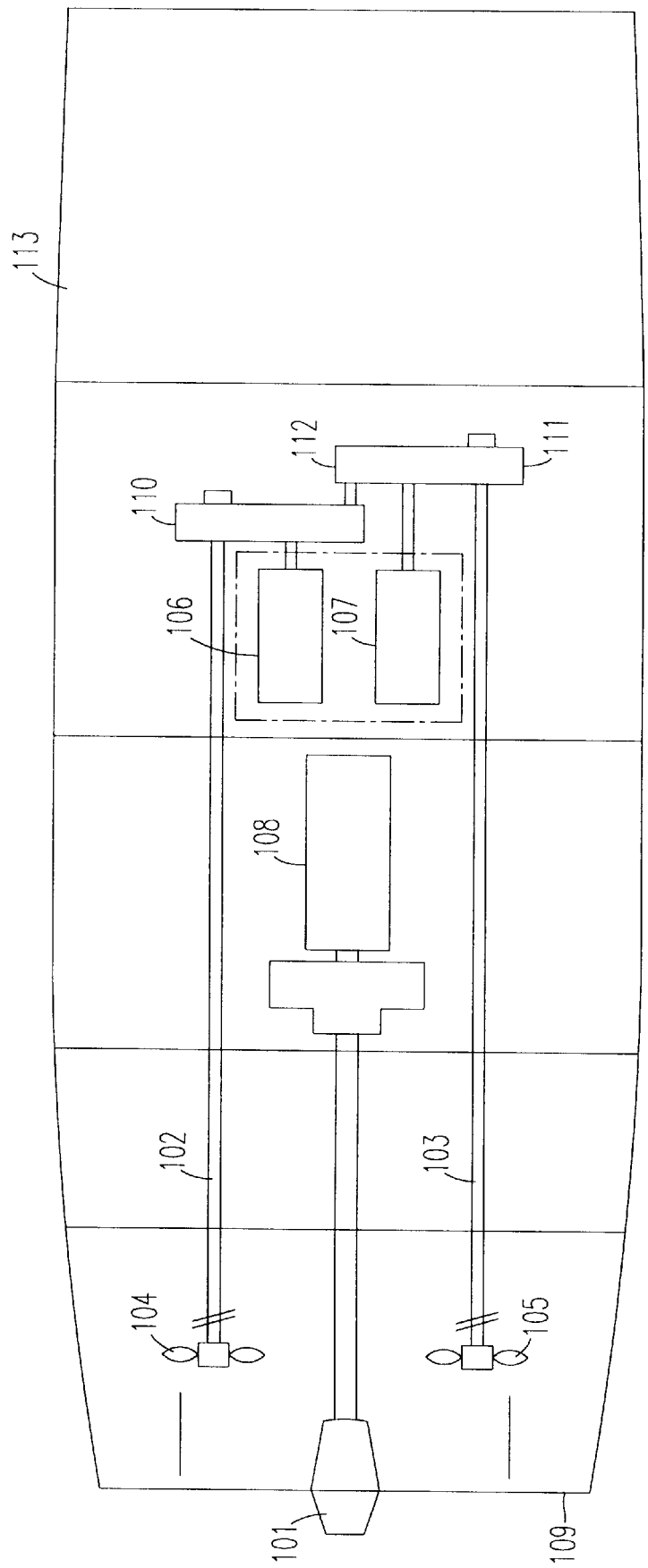
Figure 8:
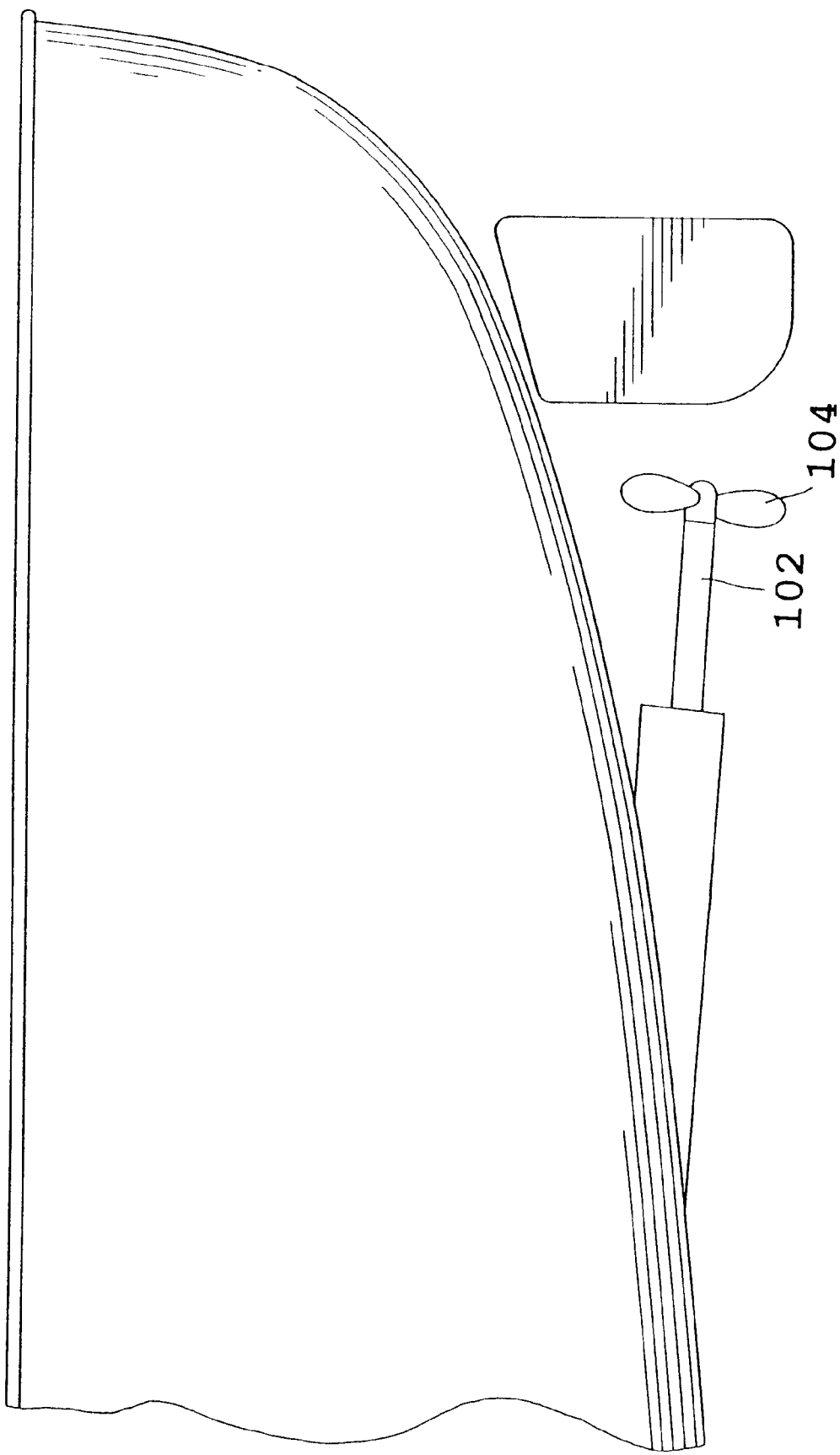

The following text, including FIGS. 6–8 refer to a ship propulsion system comprising structure and/or components which may be used in conjunction with at least one embodiment of the present invention, and the structure and functioning of which may aid in the understanding of the instant invention. It should be understood that the components discussed herebelow may be considered to be interchangeable with similar components discussed above, if appropriate.

This invention relates to a propulsion system for boats or ships, preferably for naval vessels, consisting of two Diesel engines, a gas turbine and two drive shafts located next to one another with propellers.

On similar propulsion systems of the known art, the power of the gas turbine is transmitted to the two propellers by means of a corresponding transmission. In this known case, there are design limitations that require the gas turbine to be located forward of the Diesel engines, i.e. toward the the bow of the vessel. But because the space in this area is urgently needed for other units, the object of the invention is to create a space-saving arrangement of all the mechanical equipment.

The invention teaches that this objective can be achieved by the additional provision of a water jet propulsion unit which is located between the two drive shafts which lie next to one another with propellers, by having the Diesel engines provide the propulsion for both propellers, by having the water jet propulsion take place by means of the gas turbine, and by locating the gas turbine between the Diesel engines and the stern of the vessel.

On one hand, the invention makes it possible to free up an entire compartment, and on the other hand to realize the propellers so that they are significantly smaller, on account of the significantly reduced transmission of power.

As a result of the dependence of the propulsive power to be transmitted and the related propeller diameter with the corresponding shaft slope, the overall length (shaft length) of the propulsion unit can be reduced even further.

The overall propulsion system, which is shifted further into the after portion of the vessel (i.e., abaft or astern), further reduces the exposed length of the ship.

It is also possible to realize the exhaust duct via the stern, so that in the compartments, not only has the engine room been freed up, but the stack that lies over it on the top deck can also be eliminated.

As a result of the two propulsion systems which are independent of one another, there is also a further increase in redundancy.

In an additional configuration of the invention, there is a separate transmission for each Diesel engine propulsion unit.

In an additional advantageous configuration, the two transmissions can be coupled to one another by means of a connecting transmission.

The problem of the space requirement is of particular importance in naval vessels, because the space requirements regarding the weapons systems that have to be integrated have increased significantly in recent years. The requirement to save space in the upper-deck area has increased to the same extent. The propulsion systems, which in conventional naval vessels are located amidships, with the stack on the upper deck, do not leave room for the necessary additional space occupied by the weapons and electronics systems. Therefore the engine rooms have had to be displaced a whole compartment toward the stern, which also means that the exhaust duct has to be rerouted via the aftship or after portion of the vessel. The compartment thus saved, from the tank top to the upper deck, can be made available for weapons and electronic systems.

As mentioned above, in one configuration taught by the invention, the geometric restrictions resulting from the propeller diameter and the shaft slope need only be taken into consideration for the output of the Diesel engines, which amounts to approximately 30–60% of the total output. The central unit with the gas turbine and the water jet propulsion is not limited to this geometry and can therefore be shifted toward the stern of the ship.

Moreover, the advantageous characteristics of the propeller and the water jet propulsion can be combined. Compared to a pure water jet variant which offers the same advantages in terms of space, the high efficiency of the propeller in the lower speed ranges can be retained. The same is true for the advantages of water jet propulsion in the upper speed ranges.

Because the two Diesel engine systems can be connected to one another by means of a connecting transmission, economical operation becomes possible, which means that the ship can be operated on one engine at approximately 18–21 knots. The gas turbine system is preferably operated only in the upper speed range, although it can also be used by itself as the sole propulsion system for the ship.

The above discussed embodiments of the invention will be described further hereinbelow with reference to the accompanying figures. When the word "invention" is used in this specification, the word "invention" includes "inventions", that is, the plural of "invention". By stating "invention", the Applicants do not in any way admit that the application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

The parts that are the same in the FIGS. 6 and 7, are identified by the same reference numbers. 101 is a water jet propulsion unit which is driven by means of the gas turbine 108. 102 and 103 are the drive shafts for the two propellers 104 and 105, which are driven by the Diesel engines 106 and 107 by means of the transmissions 110 and 111. 112 is the connecting transmission, by means of which the transmissions 110 and 111 can be coupled to one another.

As a result of the location of the gas turbine 108 between the Diesel engines 106 and 107 and the stern 109, on one hand the exhaust gases can be exhausted via the stern 109, which results in a significant reduction of the infrared signature, and on the other hand the compartment 113 becomes available for other purposes which, on naval vessels, means space for new weapons configurations.

FIG. 8 shows a ship in which the invention could be installed, parts that are the same or similar as those in FIGS. 6 and 7 are identified by the same reference numbers.

One feature of the invention resides broadly in the propulsion system or power plant for boats or ships, preferably for naval vessels, consisting of two Diesel engines, a gas turbine and two drive shafts located next to one another with propellers, characterized by the fact that there is also a water jet or hydrojet propulsion unit 101 between the two drive shafts 102, 103 which are located next to one another with propellers 104, 105, that the Diesel engines 106, 107 are used to drive the two propellers 104, 105, that the water jet propulsion 101 is provided by the gas turbine 108 and that the gas turbine 108 is located between the Diesel engines 106, 107 and the stern 109 of the vessel.

Another feature of the invention resides broadly in the propulsion system characterized by the fact that there is a separate transmission 110, 111 for each Diesel engine drive.

Yet another feature of the invention resides broadly in the propulsion system characterized by the fact that the two transmissions 110, 111 can be coupled to one another by means of a connecting transmission.

Moreover, the advantageous characteristics of the propeller and the water jet propulsion can be combined. Compared to a pure water jet variant which offers the same advantages in terms of space, the high efficiency off the propeller in the lower speed ranges can be retained. The same is true for the advantages of water jet propulsion in the upper speed ranges. In at least one embodiment of the invention, this combination can result in not only the added efficiency, but also allows the possibility of one or both of the propeller and/or water jet propulsion systems to be reduced in size and power.

Further, in at least one embodiment of the invention, the two diesel engines 106, 107 can be of significantly different sizes or power, allowing a smaller and/or less powerful engine to be used for low speeds and a larger and/or more powerful engine to be used, alone or in combination with the other smaller engine, at high speeds. In at least one embodiment, the connecting transmission 112 can allow the ship to continue to function even upon the occurrence of the failure of one of the two diesel engines 106, 107.

Examples of other systems and/or components thereof, which could possibly be used in conjunction with the present invention may be found in U.S. application Ser. No. 09/092,682 filed on Jun. 5, 1998, having inventors Gunther Mock, Gunther Goldthammer, Joachim Wahlers, and Knut Baumann, assigned to Blohm+Voss GmbH, and entitled "Propulsion System and Power Plant for Ships or Boats and Preferably for Naval Vessels" (Attorney Docket No. NHL-BVA-63 US).

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A naval vessel, said naval vessel comprising an ocean-going ship, said ship comprising:
   a hull;
   a propulsion system:
      said propulsion system comprising:
         at least one internal combustion engine;
         at least one gas turbine; and
         an exhaust gas system connected to said at least one internal combustion engine and said at least one gas turbine;
         said exhaust gas system being configured to transport exhaust gases from said at least one internal combustion engine and said at least one gas turbine through said hull of said ship to a point of discharge from said ship; and
         said exhaust gas system being configured to mix the exhaust gases from said at least one internal combustion engine with the exhaust gases from said at least one gas turbine upon transport of the exhaust gases through said exhaust gas system.

2. The ship according to claim 1, wherein said exhaust gas system comprises:
   at least one first exhaust pipe section connected to said at least one internal combustion engine;
   at least one second exhaust pipe section connected to said at least one gas turbine;
   a collector exhaust duct; and
   said collector exhaust duct being connected to said at least one first exhaust pipe section and said at least one second exhaust pipe section so as to be configured to mix the exhaust gases from said at least one internal combustion engine and said at least one gas turbine.

3. The ship according to claim 2, wherein said collector exhaust duct extends substantially horizontally within said ship to said discharge point.

4. The ship according to claim 3, wherein said discharge point comprises a discharge outlet disposed at a stern of the ship.

5. The ship according to claim 4, wherein said discharge outlet is disposed above the water line of said ship to permit the release of the mixed gases into the atmosphere.

6. The ship according to claim 5, wherein:
   said at least one gas turbine comprises one gas turbine;
   said at least one internal combustion engine comprises a first internal combustion engine and a second internal combustion engine;
   said at least one first exhaust pipe section comprises two first exhaust pipe sections;
   one of said two first exhaust pipe sections is connected to said first internal combustion engine;
   the other of said two first exhaust pipe sections is connected to said second internal combustion engine;
   said one of said two first exhaust pipe sections connected to said first internal combustion engine comprises a first mouth portion connecting said one of said two first exhaust pipe sections to said collector exhaust duct;
   said other of said two first exhaust pipe sections connected to said second internal combustion engine comprises a second mouth portion connecting said other of said two first exhaust pipe sections to said collector exhaust duct;
   said at least one second exhaust pipe section comprises one second exhaust pipe section connected to said one gas turbine;

said second exhaust pipe section comprises a third mouth portion connecting said second exhaust pipe section to said collector exhaust duct;

said third mouth portion is disposed substantially between said first mouth portion and said second mouth portion;

said collector exhaust duct is divided substantially centrally by a partition;

said partition has a first end disposed adjacent said first, second and third mouth portions;

said partition has a second end disposed adjacent said discharge outlet; and said first and second mouth portions being configured to transport exhaust gases to opposite sides of said partition.

7. The ship according to claim 6, wherein:

said discharge outlet is disposed substantially adjacent the water line; and said discharge outlet comprises an arrangement to direct said exhaust gases toward the surface of the water.

8. The ship according to claim 7 wherein:

said collector exhaust duct comprises apparatus to cool said mixed exhaust gases; and said apparatus to cool comprises an arrangement to inject water into said mixed exhaust gases.

9. The ship according to claim 8, wherein said collector exhaust duct comprises a mixing chamber disposed adjacent said first end of said partition.

10. The exhaust system according to claim 8, wherein said at least one collector duct comprises a mixing chamber disposed adjacent said first end of said partition.

11. An exhaust system for ships, which ships each comprise a propulsion system having at least one internal combustion engine and at least one gas turbine, said exhaust system comprising:

at least one first exhaust pipe section configured to be connected to at least one internal combustion engine;

at least one second exhaust pipe section configured to be connected to at least one gas turbine;

at least one collector exhaust duct;

said at least one collector exhaust duct comprising a discharge outlet configured to discharge exhaust gases from a ship; and said collector exhaust duct being connected to said at least one first exhaust pipe section and said at least one second exhaust pipe section so as to be configured to mix exhaust gases from the at least one internal combustion engine and the at least one gas turbine, and to cool the exhaust gases of the at least one gas turbine, upon connection of said said exhaust system to a propulsion system of the ship.

12. The exhaust system according to claim 11, wherein said collector exhaust duct is configured to to be disposed and extend substantially horizontally within the ship to said discharge outlet.

13. The exhaust system according to claim 12, wherein said discharge outlet is configured to be disposed at a stern of the ship.

14. The exhaust system according to claim 13, wherein said discharge outlet is configured to be disposed above the water line of the ship to permit the release of the mixed exhaust gases into the atmosphere.

15. The exhaust system according to claim 14, wherein the propulsion system of the ship comprises one gas turbine and a first internal combustion engine and a second internal combustion engine, and wherein:

said at least one first exhaust pipe section comprises two first exhaust pipe sections;

said two first exhaust pipe sections comprise a first pipe configured to be connected to the first internal combustion engine and a second pipe configured to be connected to the second internal combustion engine;

said first pipe comprises a first mouth portion connecting said first pipe to said at least one collector duct;

said second pipe comprises a second mouth portion connecting said second pipe to said at least one collector duct;

said at least one second exhaust pipe section comprises one second exhaust pipe section configured to be connected to the gas turbine;

said second exhaust pipe section comprises a third mouth portion connecting said second exhaust pipe section to said at least one exhaust duct;

said third mouth portion is disposed substantially between said first mouth portion and said second mouth portion;

said at least one collector duct is divided substantially centrally by a partition;

said partition has a first end disposed adjacent said first, second and third mouth portions; and said partition has a second end disposed adjacent said discharge outlet.

16. The exhaust system according to claim 15, wherein said discharge outlet is configured to be disposed substantially adjacent to the water line; and said discharge outlet comprises an arrangement configured to direct said mixed exhaust gases toward the water line.

17. The exhaust system according to claim 16, wherein:

said at least one collector duct comprises an arrangement configured to cool the mixed exhaust gases; and said arrangement is configured to inject water into the mixed exhaust gases.

18. Method for the discharging of exhaust gases from a ship; the ship comprising a hull, and a propulsion system; the propulsion system comprising at least one internal combustion engine, at least one gas turbine, and an exhaust gas system connected to the at least one internal combustion engine and the at least one gas turbine; the exhaust gas system comprises at least one first exhaust pipe section connected to the at least one internal combustion engine, at least one second exhaust pipe section connected to the at least one gas turbine, a collector exhaust duct, and the collector exhaust duct being connected to the at least one first exhaust pipe section and the at least one second exhaust pipe section to permit the mixing of the exhaust gases from the at least one internal combustion engine and the at least one gas turbine, and to cool the exhaust gases from the at least one gas turbine, said method comprising the steps of:

routing exhaust gases from the at least one internal combustion engine through the at least one first exhaust pipe section;

routing exhaust gases from the at least one gas turbine through the at least one second exhaust pipe section;

emptying the exhaust gases from the at least one first exhaust pipe section and from the at least one second exhaust pipe section into the collector exhaust duct;

mixing the exhaust gases from the at least one internal combustion engine with the exhaust gases from the at least one gas turbine in the at least one common collector duct;

cooling the exhaust gases from the at least one gas turbine; and transporting substantially horizontally the mixed exhaust gases through the hull of the ship to a discharge point disposed above the water line, at a stern of the ship; and discharging the mixed exhaust gases into the atmosphere at the discharge point.

19. The method according to claim 18, wherein the at least one gas turbine comprises one gas turbine, the at least one internal combustion engine comprises a first internal combustion engine and a second internal combustion engine; the at least one first exhaust pipe section comprises two first exhaust pipe sections; one of the two first exhaust pipe sections is connected to the first internal combustion engine; the other of the two first exhaust pipe sections is connected to the second internal combustion engine; the one of the two first exhaust pipe sections connected to the first internal combustion engine comprises a first mouth portion connecting the one of the two first exhaust pipe sections to the collector exhaust duct; the other of the two first exhaust pipe sections connected to the second internal combustion engine comprises a second mouth portion connecting the other of the two first exhaust pipe sections to the collector exhaust duct; the at least one second exhaust pipe section comprises one second exhaust pipe section connected to the one gas turbine; the second exhaust pipe section comprises a third mouth portion connecting the second exhaust pipe section to the collector exhaust duct; the third mouth portion is disposed substantially between the first mouth portion and the second mouth portion; the at least one collector exhaust duct is divided substantially centrally by a partition; the partition has a first end disposed adjacent the first, second and third mouth portions; and the partition has a second end disposed adjacent the discharge outlet; said method further comprises:

said step of emptying the exhaust gases from the at least one first exhaust pipe section and from the at least one second exhaust pipe section into the collector exhaust duct comprises the steps of:

emptying the exhaust gases from the first internal combustion engine into the collector exhaust duct by way of the first mouth portion;

emptying the exhaust gases from the second internal combustion engine into the collector exhaust duct by way of the second mouth portion;

emptying the exhaust gas from the gas turbine into the collector exhaust duct at a point substantially between the entry points of the exhaust gases from the first and second internal combustion engines, by way of the third mouth portion which is disposed between the first and second mouth portions; and said step of mixing the exhaust gases from the at least one internal combustion engine with the exhaust gases from the at least one gas turbine in the collector exhaust duct comprises:

substantially separating the exhaust gases from the first and second internal combustion engines by means of a partition; and mixing the exhaust gases from each of the first and second internal combustion engines with the exhaust gases from the gas turbine.

20. The method according to claim 19, wherein:

said step of discharging the mixed gases into the atmosphere at the discharge point comprises the steps of:

discharging the mixed gases substantially adjacent the water line; and directing the mixed exhaust gases toward the surface of the water;

said method further comprises the steps of:

cooling the mixed exhaust gases; and said step of cooling comprises the step of injecting water into the mixed exhaust gases.

* * * * *

UNITED STATES PATENT AND TRADEMARK OFFICE
CERTIFICATE OF CORRECTION

PATENT NO. : 6,010,379
DATED : January 4, 2000
INVENTOR(S) : Knut BAUMANN

It is certified that error appears in the above-indentified patent and that said Letters Patent is hereby corrected as shown below:

In column 4, line 35, after 'October,', delete "1995" and insert --1955--.

In column 9, line 4, after 'efficiency', delete "off" and insert --of--.

Signed and Sealed this

Second Day of January, 2001

Attest:

Q. TODD DICKINSON

Attesting Officer

Commissioner of Patents and Trademarks